April 14, 1970    J. E. MILLER    3,506,864
ARMATURE WINDING AND COMMUTATOR CONNECTION
Filed Feb. 9, 1968    7 Sheets-Sheet 1

INVENTOR.
JERRY E. MILLER
BY
HIS ATTORNEYS

April 14, 1970 J. E. MILLER 3,506,864
ARMATURE WINDING AND COMMUTATOR CONNECTION
Filed Feb. 9, 1968 7 Sheets-Sheet 2

INVENTOR.
JERRY E. MILLER
BY
HIS ATTORNEYS

INVENTOR.
JERRY E. MILLER
BY
HIS ATTORNEYS

April 14, 1970  J. E. MILLER  3,506,864
ARMATURE WINDING AND COMMUTATOR CONNECTION
Filed Feb. 9, 1968  7 Sheets-Sheet 4

INVENTOR.
JERRY E. MILLER
BY
HIS ATTORNEYS

April 14, 1970    J. E. MILLER    3,506,864
ARMATURE WINDING AND COMMUTATOR CONNECTION
Filed Feb. 9, 1968    7 Sheets-Sheet 6

INVENTOR.
JERRY E. MILLER
BY
HIS ATTORNEYS

April 14, 1970     J. E. MILLER     3,506,864
ARMATURE WINDING AND COMMUTATOR CONNECTION
Filed Feb. 9, 1968     7 Sheets-Sheet 7

INVENTOR.
JERRY E. MILLER
BY
HIS ATTORNEYS

United States Patent Office 3,506,864
Patented Apr. 14, 1970

3,506,864
ARMATURE WINDING AND COMMUTATOR
CONNECTION
Jerry E. Miller, Dayton, Ohio, assignor to The Globe
Tool and Engineering Company, Dayton, Ohio, a corporation of Ohio
Filed Feb. 9, 1968, Ser. No. 704,342
Int. Cl. H02k 3/46
U.S. Cl. 310—234             14 Claims

ABSTRACT OF THE DISCLOSURE

Novel winding patterns for armatures having various numbers of slots and either one or two coils per slot are disclosed along with methods and apparatus for winding armatures. Lead wires between coils are wrapped around the armature shaft and looped around commutator tangs. An efficient method of obtaining armatures having opposite polarities is also shown and described.

---

This invention relates to armature winding and more particularly to the winding of armatures with commutators having tangs. It will become apparent, however, that the invention is not necessarily so limited.

Several types of armature winding machines have been developed and are in use in everyday production. The various types of armature winding machines include machines wherein an armature is rapidly rotated with respect to a wire guide in such a fashion that wire is drawn from a wire supply through the wire guide to form wound coils in pairs of slots in the armature. Another type of armature winding machine employs a wire guide which is reciprocated to traverse the length of an armature. At each end of the armature core the wire guide normally hesitates and the armature is oscillated to present a different slot in position to receive wire from the wire guide. Still another type of armature winding machine incorporates a rotating wire guide or flier which cooperates with a wire guide wing against which an armature core is placed such that when the flier is rotated a coil is wound in a pair of slots in the armature core. Several variations of the three types of machines mentioned above have been used. In each type, machines have been developed which wind more than one coil at a time and in some cases all of the coils for an armature may be wound simultaneously.

A popular type of automatic armature winding machine in present use is known as the "double flier" armature winding machine. This type of machine is relatively simple in construction yet quite versatile and fast operating. A conventional double flier type armature winding machine will normally have wire from two supply reels coursed separately through two spindles on which the fliers are mounted. The start ends of the wires are held by a clamp or clamps adjacent the axis of the armature shaft of the armature core to be wound. When both fliers are subsequently rotated, wire will be guided from the fliers by wire guides or wings into two pairs of armature slots. A double flier machine can readily be tooled and controlled to wind either one coil for each slot, or a total of two coil sides in each slot, or else two coils per slot. Also, as disclosed in United States Patent No. 2,670,145 issued to John M. Biddison on Feb. 23, 1954, double flier armature winding machines can be used to wind coils in armatures having an odd number of slots by temporarily disabling one flier as the first coil (or coils) is wound in a first pair of slots. The coils wound in subsequent pairs of slots are then wound by both fliers.

Various types of patterns of wind for armature coils have been developed taking into consideration the special requirements of a double flier armature winding machine.

Between each coil wound by a flier, a commutator lead connection must be formed by the wire. This commutator wire lead connection may be in the form of a lead loop such as described for example in the Harry W. Moore Patent No. 2,627,379, issued Feb. 3, 1953. After the armature is completely wound the lead loops are connected to the commutator segments. In some cases the wire leads are temporarily connected to the commutator segments during the automatic winding cycle of the winding machines. One of the difficulties encountered in armature winding machines is the need to provide for the winding of a coil and the subsequent formation of a lead, whether in the form of a lead loop or a connection to a commutator segment, and then the winding of a second coil by the same flier without uncoiling or unraveling the wire already wound.

To form wire leads yet not unwind previously wound coils during the automatic operation of an armature winding machine, it is now conventional to form what is known as an "anchored lead" between each coil. The anchored lead includes a length of wire coursed through a slot adjacent one of the pairs of slots in which a coil is wound either just before or just after the lead loop or the commutator connection is made. As a result, the lead wire is "anchored" to one of the teeth which separates the armature slots. United States Patent No. 3,191,269 granted to Harry W. Moore on June 29, 1965, illustrates various winding patterns having anchored leads.

There are several drawbacks to the use of anchored leads. The lengths of wire passing through the adjacent slots extend in the opposite electrical direction to the wires forming the coil sides therein and, electrically, these lengths of wire perform no useful function. Some armatures are so small in relation to the wire size used therein that they cannot accept the electrically useless wire or wires in each slot. The electrically useless wire or wires in each slot invariably add to the total length of wire used in winding an armature. Further, the movements of the fliers and of armatures being wound when the leads are being formed have been quite complex and time consuming partly because of the necessity of placing the useless wire in the slots. In fact, because the fliers can be rotated at extremely fast speeds when winding coils, a quite significant portion of the automatic cycle for winding a typical armature is consumed during the intervals in which the leads are formed.

A preferred type of connection of a wire lead to a commutator segment is the tang type. Risers or slots in commutator segments are typically difficult to produce and the final connection may not have the strength of the tang type connection. Temporary tang type connections can conveniently be made during the automatic cycle of a winding machine by appropriate movement of the armature being wound, the flier or fliers, and a tang shield which is used to prevent accidental hooking of the wire to the tang during the winding of the coils. The final permanent connection is readily and easily made by applying a hot stake to the upturned end of the tang which fuses the lead to the tang and at the same time burns off or evaporates the insulating coating from the wire lead.

As discussed in the aforementioned Moore Patent No. 3,191,269, the problem arises that wire leads connected to the commutator tangs during the early part of the automatic winding cycle may be wound under coils subsequently formed and the first formed leads are placed under considerable tension by coils wound thereover. In the extreme, this could result in breakage of the leads and in every case the danger exists that the insulating coating on some of the leads may be destroyed during the winding cycle, or when additional strain, due to the centrifugal forces acting thereon, is exerted on the leads when the armature is in operation. For these reasons, the Moore Patent No. 3,191,269 discloses leads extended partially around an armature shaft to commutator segments remote from the slots from which the leads extend. The leads thus formed are less likely to be placed under tension by coils subsequently wound and will be at least partially supported by the armature shaft.

Some armatures, and especially armatures having two coils per slot, have not had tang type connections because space limitations between adjacent tangs would result in mutual engagement of lead wires quite close to the tanks. During the hot staking of the leads, the insulating coating of the touching lead wires would often be destroyed. Even if not destroyed during the hot staking operation, the lead wires may constantly abrasively rub against one another because of the centrifugal forces acting thereon when the armature is in use, and the insulation may ultimately be weakened or destroyed.

An object of this invention is to provide an improved winding pattern for armatures. The winding pattern of this invention requires less wire and has a lead which is more fully supported by the armature shaft than conventional prior art commutator leads. It does not have the electrically useless wires extending through any of the slots. As a result, the armature is both mechanically and electrically superior to prior art armatures automatically wound. This object is accomplished by wrapping the wire leads completely around the armature shaft whereupon the armature shaft rather than the teeth between armature slots serves to anchor the leads. This winding pattern is well suited for use with commutators having tangs. However, the winding pattern may also be useful with commutators having slots or risers for lead connections. Furthermore, the winding pattern is adaptable for use in winding armatures having either an odd or an even number of slots whether or not one or two coils per slot are formed.

Another object of this invention resides in the provision of an improved commutator lead connection for tang type commutators. This is accomplished by looping a lead wire under and then over and back under its associated tang. The lead wire thus crosses over itself immediately beneath the tang. Destruction of the insulation at this point, either from the hot staking process or from mutual abrasion of the crossed wires, is harmless because the crossed wires are electrically identical. The points of crossover of lead wires between adjacent commutator segments are spaced relatively far from the commutator and thus are unaffected by the heat generated during the hot staking operations.

Further, it is an object of this invention to advantageously utilize the aforementioned improved lead connections in the aforementioned improved winding pattern. As a result the support of lead wires by the armature shaft is maximized and, accordingly, the adverse effects of the centrifugal forces acting thereon minimized.

Other objects and advantages will become apparent from the following description. For example, as will be described below, the winding pattern in accordance with this invention is advantageously adapted to wind armatures having opposite polarities with very little change in the winding pattern.

Referring to the drawings:

FIGURE 6 is a completed winding diagram of another pattern of wind in accordance with this invention. In FIGURE 6, one strand of wire forms the entire winding.

FIGURES 14, 16, 17 and 19 are side views similar to FIGURES 10 and 12. FIGURES 15, 18 and 20 are views similar to FIGURES 11 and 13, taken along section lines 15—15, 18—18 and 20—20 of FIGURES 14, 17 and 19, respectively. In FIGURES 18 and 20 the commutator is shown in end view with a tang shield removed.

Figures 1, 2, 3:
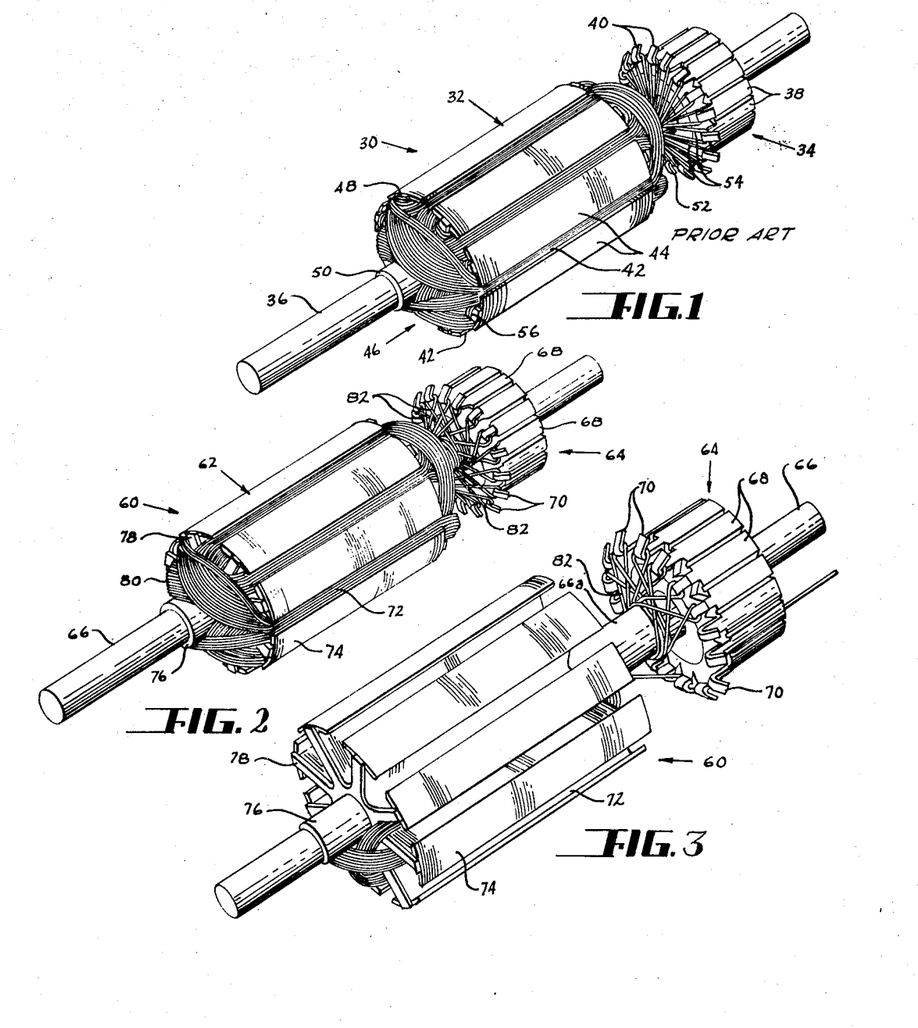
FIGURE 1 is a perspective view of an armature having a prior art winding.
FIGURE 2 is a perspective view of an armature wound in accordance with the present invention.
FIGURE 3 is an enlarged perspective view of the armature of FIGURE 2 when partially wound.

Referring to the drawings in greater detail, FIGURE 1 illustrates an armature 30 of the type having a laminated core 32 and a commutator 34 mounted on an armature shaft 36. The commutator 34 has a plurality of circumferentially spaced commutator segments 38 terminating in hook-shaped tangs 40 adjacent one end of the laminated core 32. The core 32 has a plurality of radially extending slots 42 separated by T-shaped teeth 44 which receive coil windings 46. As well known, the coil windings 46 are wound from insulated wire. To prevent electrical contact between the windings 46 and the other parts of the armature 30 which might be caused by rubbing of the insulated wire on the metal parts of the armature during the winding process or during subsequent use of the armature, the windings 46 are completely isolated from the armature core 32 and the shaft 36. Thus, there will be a U-shaped slot insulator (not shown) in each of the slots 42. Both ends of the commutator 34 are covered by insulating end pieces 48. An insulating sleeve 50 surrounding the shaft 36 abuts the end 48 farthest from the commutator end of the armature 30 and a similar insulating sleeve 52 extends between the commutator 34 and the adjacent end of the armature core 32.

The armature 30 is of the type having two coils per slot. Since each coil has two coil sides, one in each of two slots, a total of four coil sides are located in overlapping relation in each slot 42. Between each coil of the coil windings 46 there is a wire lead 54 formed from the same wire as the coil windings 46. The wire leads 54 in FIGURE 1 are of the type illustrated in the aforementioned Moore Patent No. 3,191,269. Accordingly, each wire lead 54 projects out of one of the slots 42 and partially around the armature shaft 36 to a selected commutator tang 40, over the selected tang 40, and then back along a generally parallel path to either the same or an adjacent slot 42. Each wire lead 54 is partially supported by the armature shaft 36 by engaging the sleeve 52. In addition, each wire lead 54 includes or is accompanied by a length of wire extending through a slot adjacent to one of the slots in which either the previous coil or the subsequent coil is wound, whereupon the strand of wire is hooked about one of the teeth 44 to "anchor" the leads 54 in position and thereby prevent unraveling of the wire during subsequent winding operations. The portions of the wires between coils hooked about the teeth 44 are indicated by the reference character 56 in FIGURE 1. Because there are two coils per slot in the armature of FIGURE 1, there are also two hooked portions 56 wrapped about each tooth 44. There are eight slots in the armature of FIGURE 1. Accordingly, sixteen commutator segments 38 with tangs 40 are required for the sixteen wire leads 54. As already mentioned, the basic winding pattern of FIGURE 1 as well as the basic winding pattern to be described below can be used in winding armatures having a different number of slots as well as in armatures wherein there is to be only one coil in each pair of slots.

Those skilled in the art will recognize that the armature 30 of FIGURE 1 is not completely finished. Further finishing operations would include the insertion of insulating wedges or ropes at the top of the slots 42 and, frequently, the impregnation of the windings 46 with a varnish or like material. Also, the commutator tangs 40 would be subjected to heat and pressure as by a hot staking operation to fuse the wire leads 54 thereto and at the same time to burn insulation off from the wire forming the leads 54.

The commutator lead arrangement of FIGURE 1 is satisfactory for many purposes. It is apparent, however, that a considerable portion of each of the wire leads 54 is unsupported. Also, in cases where the commutator tangs are closer together than shown in FIGURE 1, or the wire diameter is greater than that shown in FIGURE 1, adjacent leads 54 would be quite close together and may even be in mutual engagement close to the tangs 40. In such cases, the hot staking operation may cause the wire insulation to be burned off to the point of mutual engagement whereupon wire leads to adjacent tangs 40 would be shorted. Also, the armature of FIGURE 1 suffers from the drawbacks resulting from the lengths of wire between coils hooked around the armature teeth 44. Since these lengths of wire are electrically useless, it is apparent that electrically equivalent armatures could be made if these were omitted. Omission of the electrically useless lengths of wire would obviously result in a lesser amount of wire required to wind an armature and, therefore, could result in a considerable cost savings in the mass production of armatures. Some armatures, especially those employing large diameter wires, cannot be wound as illustrated in FIGURE 1 because the slots 42 are completely filled by the coil turns to meet power requirements and there is insufficient space in the slots 42 for the electrically useless lengths of wire.

An armature of the type made in accordance with this invention is illustrated in FIGURE 2. In FIGURE 2, the armature, generally designated 60, has a laminated core 62 and a commutator 64 mounted on an armature shaft 66. The commutator 64 has sixteen commutator segments 68 with tangs 70 adjacent one end of the laminated core 62. The eight radial armature slots 72 of the armature 60 are separated by armature teeth 74. As before, a completed armature 60 would have insulators such as the insulating sleeve 76 and end-piece 78. Thus, except for the coil windings, designated 80, and the wire leads, designated 82, the armature 60 may be identical to the armature 30.

In FIGURE 2 the wire leads 82 are wrapped more than 360 degrees around the shaft 66 and are also looped completely about the commutator tangs 70. For this reason, each wire lead crosses over itself immediately beneath its associated tang 70. The wrapping of the wire leads 82 about the shaft 66 serves to anchor them and, accordingly, there are no dead or electrically useless wires in the armature 60 of FIGURE 2 corresponding to the wire portions designated 56 in FIGURE 1.

FIGURE 3 shows a portion of the armature 60 of FIGURE 2 when partially wound. The wrapping of the wire leads 82 about the shaft 66 is clearly illustrated in FIGURE 3. It will be observed that each wire lead 82 is projected out of a radial armature slot 72 partially around the shaft 66 and beyond its associated tang 70, then wrapped or looped back over its associated tang 70, and then continued about the shaft 66. The extension of each wire lead 82 first beneath its associated tang 70 and then over the same tang 70 and then on around the shaft 66 results in each wire lead 82 being wrapped about the shaft 66 close to the commutator 64. Accordingly, the leads 82 formed during the early part of the winding operation are not wound under or placed under tension by the subsequently wound coil forming the windings 80. In the final finishing operations, wherein the tangs 70 are hot staked, the likelihood that adjacent leads 82 will be in mutual engagement sufficiently near the hot stake to cause shorting is considerably reduced. It is possible that heat applied to the tangs 70 will remove insulation to the point where each lead 82 crosses itself. Removal of the insulation at this point of each lead 82 is harmless because the two crossing wire portions are electrically identical.

Figure 4:
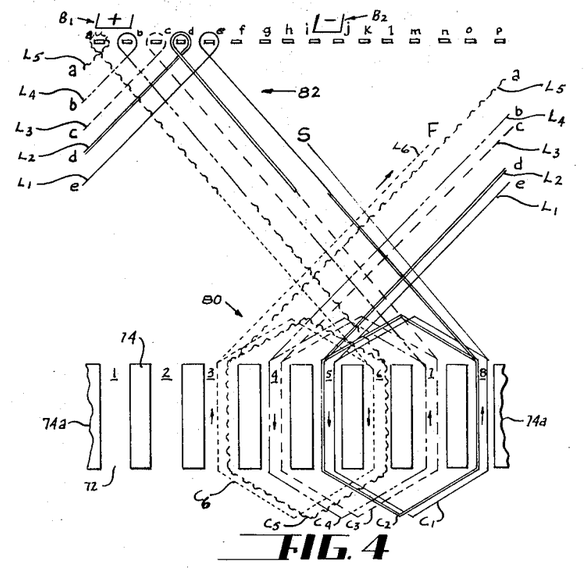
FIGURE 4 is a portion of a possible winding diagram for the armature of FIGURE 2.
Figure 5:
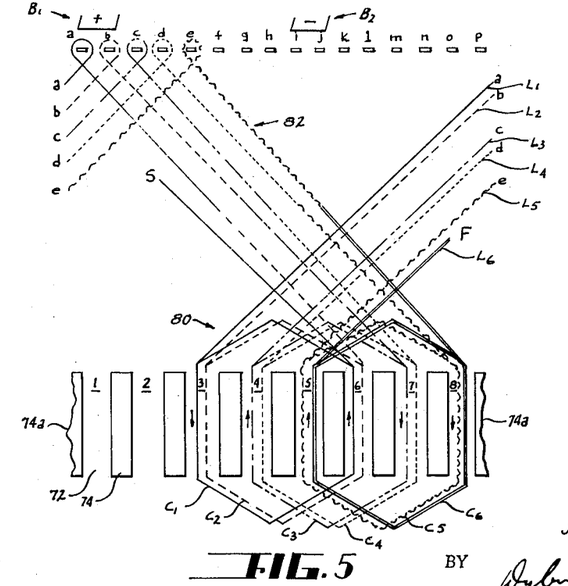
FIGURE 5 is a portion of a winding diagram of the same type of armature as FIGURE 4 but wound with the opposite polarity.

FIGURES 4 and 5 are winding diagrams, either of which may be used as the winding pattern of the armature of FIGURES 2 and 3. For reasons which will be discussed later, the winding diagram of FIGURE 4 may be referred to as "retrogressive" and the winding diagram of FIGURE 5 as "progressive." For convenience, six coils, designated $C_1$ through $C_6$, forming part of the windings 80, are shown in FIGURES 4 and 5 as if wound from a single strand of wire beginning with a start end S and ending in a finish end F which forms part of a wire lead $L_6$. If the complete winding pattern were illustrated, there would be sixteen coils shown between the start end S and the finish end F. The individual armature slots 72 are labeled 1 through 8 and the individual tangs 70 are labeled $a$ through $p$. As conventional, the winding diagrams of FIGURES 4 and 5 represent armatures "laid flat" with the sixteen tangs 70 shown side-by-side and the slots 72 separated by eight teeth 74 shown side-by-side. In order to completely show each of the eight slots 72, one tooth, designated 74a, is shown on each side of FIGURES 4 and 5. The wire leads 82, designated $L_1$ through $L_5$, are shown progressing out of the slots 72 and toward the right side of FIGURES 4 and 5 to the positions designated $a$, $b$, $c$, $d$ and $e$ conforming to the particular tangs 70 to which the wire leads 82 are directed. Because the wire leads are wrapped or looped about the armature shaft 66 (not shown in these diagrams), the same positions $a$, $b$, $c$, $d$ and $e$ are duplicated on the left side of FIGURES 4 and 5. It will be understood that the wire leads 82 are continuous and not broken, it being impossible to clearly illustrate the wrapping or the looping of the wire leads about the shaft 66 in a winding diagram of this type.

Referring specifically to FIGURE 4, proceeding from the start wire S, wire is wound downwardly through slot 8 and upwardly through slot 5 to form the coil $C_1$. (The arrows in the armature slots 72 refer to the direction of current flow and not to the direction of wind.) By convention, the entire coil $C_1$ is represented by a single line. In practice, the coil $C_1$ would normally be formed from many turns of wire, each turn progressing downwardly through slot 8 and upwardly through slot 5 with its end turns spanning the end of the armature core between slot 8 and slot 5. After the appropriate number of turns have been wound, the wire lead designated $L_1$ projects out of slot 5 and in the same direction as the wire turns forming the coil $C_1$ and, thence, around the armature shaft 66 to the tang 70 designated $e$. After being looped about the tang $e$ in the manner previously described, the wire is continued about the shaft 66 and again downwardly through the slot 8 and upwardly through the slot 5 to form the coil $C_2$. To distinguish between the coils $C_1$ and $C_2$, the coil $C_2$ is shown as a double line. After the appropriate number of turns of wire have been wound in slots 8 and 5 to form the coil $C_2$, the wire lead $L_2$ is extended from slot 5 in a direction generally parallel to the wire lead $L_1$ partially around the shaft and is then looped about the tang $d$ and continued around the shaft. Two coils have now been wound in the pair of slots 8 and 5. From the tang $d$ the wire progresses downwardly through slot 7 and upwardly through slot 4 to form the coil $C_3$ in these slots, the coil $C_3$ being pictorally represented by a dash line. After the appropriate number of turns, the wire lead $L_3$ projects from slot 4 to tang $c$ and subsequently the coil $C_4$, which is designated by a broken line, is formed in the same pair of slots 7 and 4 with the wire lead $L_4$ projecting therefrom and looped about the tang $b$. Following the same winding pattern, the coil $C_5$ is then wound in slots 6 and 3 with the wire lead $L_5$ projecting therefrom looped about the tang $a$ and the coil $C_6$ is formed in the same pair of slots with the wire lead $L_6$ projecting therefrom. As mentioned above, the winding diagram of FIGURE 4 is only partially completed. If the winding diagram were complete, the wire lead $L_6$ would be shown looped about the tang $p$ with subsequent wire leads being looped about tangs $o, n, m$, and so forth.

In FIGURE 5 the coils $C_1$ and $C_2$ are shown wound in slots 6 and 3 with the wire lead $L_1$ therebetween looped about the tang $a$. The wire lead $L_2$ extending from the coil $C_2$ is looped about the tang $b$ and enters into slot 7 to the start of coil $C_3$ wound in slots 7 and 4. The location of the coils $C_4$, $C_5$ and $C_6$, follow the same pattern as that of FIGURE 4 except that, in FIGURE 5, the coils $C_5$ and $C_6$ are wound in a pair of slots 8 and 5 to the right of slots 7 and 4 which receive the coils $C_3$ and $C_4$. The wire leads $L_3$, $L_4$ and $L_5$ are, in the case of FIGURE 5, connected or looped about the tangs $c$, $d$ and $e$. Wire lead $L_6$ in FIGURE 5, of course, would be connected to tang $f$ and the winding would progress if the completed winding pattern were shown in FIGURE 5 with the next coil wound in slots 1 and 6.

It should be noted in connection with both FIGURES 4 and 5 that, after the windings are complete, the start and the finish ends of the wire would lose their identity. Thus, in FIGURE 4 the start end and the finish end would ultimately be connected together around the tang $f$ and together would form another wire lead 82. Similarly, in FIGURE 5 the start and finish ends of the wire would be wrapped together around tang $p$ to form a wire lead 82. As will be further described below, the windings may conveniently be formed from two strands of wire with the start end of one strand connected to the finish end of the other strand and vice versa. The winding patterns of FIGURES 4 and 5 are suited to flier type winding machines and especially double flier armature winding machines and the foregoing description has proceeded with the assumption that the winding would commence with the start end illustrated. It will be appreciated by those skilled in the art, however, that the winding pattern need not be accomplished by a flier type winding machine.

Also illustrated in FIGURES 4 and 5 are a pair of commutator brushes $B_1$ and $B_2$ positioned as brushes may be positioned when fully wound armatures of the type illustrated therein are in use in an electric motor. For purposes of discussion it is assumed in both FIGURES 4 and 5 that, at a given instant, the brushes $B_1$ span tangs $a$ and $b$ and are the positive brushes while the brushes $B_2$, spanning tangs $i$ and $j$, are the negative brushes. Conventional current flow, that is from positive to negative, is also assumed. Although there appears to be very little difference between the armatures of FIGURES 4 and 5 it will be obvious that the two armatures illustrated therein are of opposite polarities. With the brush connections illustrated in FIGURE 4, the coil $C_5$ in slots 6 and 3 is the commutated or shorted coil because the wire leads at each end of the coil $C_5$, being connected to the tangs $a$ and $b$, are connected to the positive brush $B_1$. Current flow in coil $C_6$ is upwardly through slot 3 and downwardly through slot 6. Current flow through the other coils is as indicated by the arrows in the slots 72 of FIGURE 4. In FIGURE 5, the shorted or commutated coil is coil $C_2$ which is also in slots 3 and 6. However, current flow is downwardly through coil $C_1$ in slot 3 and upwardly through slot 6 and, as indicated by the arrows appearing in the slots 72 of FIGURE 5, the current flow through each of these slots 72 is opposite to that shown in FIGURE 4. As will be discussed below, the same flier type armature winder, with only a minor change in a control setting, can be used to wind either the pattern of FIGURE 4 or that of FIGURE 5.

Figure 6:
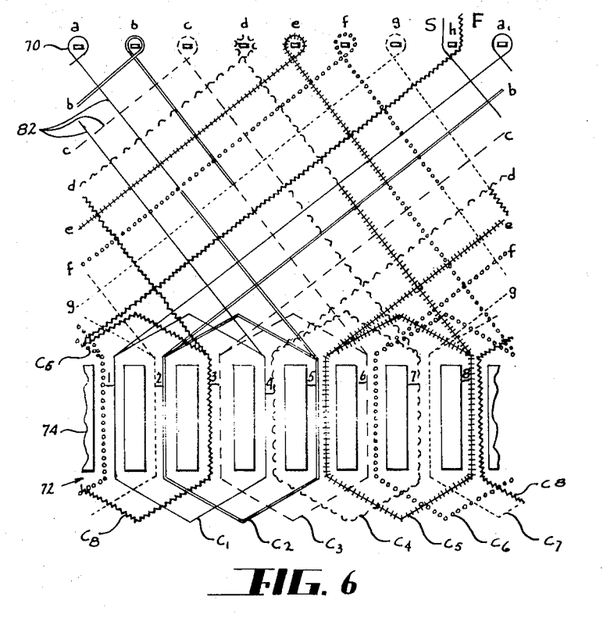
Figure 7:
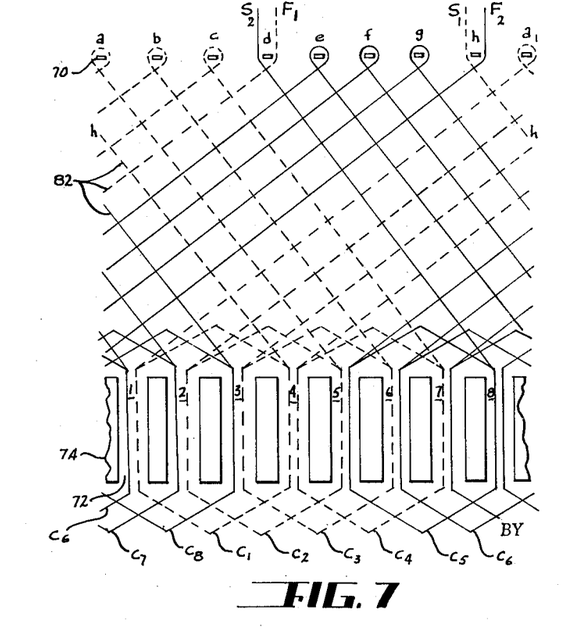
FIGURE 7 is a winding diagram of a pattern of wind for an armature electrically identical to the pattern of wind of FIGURE 6 but wound from two strands of wire.

FIGURES 6 and 7 are complete winding diagrams of eight slot armatures having one coil per slot and, accordingly, eight tangs, wound with wire leads 82 wrapped around the armature shaft (not shown in these figures) in accordance with this invention. In FIGURE 6, each of the coils, marked $C_1$ through $C_8$, are shown in distinctively different types of lines so that the individual coils and the lead wires between coils can be more easily identified. The slots 72 between the teeth 74 are again labeled 1 through 8 and the tangs labeled $a$ through $h$. Tang $a$ is shown on both sides and is labeled $a_1$ on the right side of both FIGURES 6 and 7. FIGURE 6 illustrates the manner in which an armature can be wound from one strand of wire beginning with its start end S at tang $h$. Proceeding from tang $h$, the wire is coursed downwardly through slot 4 and upwardly through slot 1 to form the coil $C_1$. After the appropriate number of turns have been wound, the wire is then projected to the tang $a$, looped under and around the tang $a$, and then coursed downwardly through slot 5 and upwardly through slot 2 to form the coil $C_2$. The winding pattern of FIGURE 6 is completed by continuing the looping of the wire about the tangs 70 and the coursing of the wire through the slots 72 in the manner just described until the coil $C_8$ has been completed, at which time the finish end F of the wire is brought from the slot 8 to tang $h$. As part of the finishing operation, the start and finish ends S and F, respectively, are twisted together about the tang $h$.

FIGURE 7 illustrates the winding pattern of FIGURE 6 but wound from two strands of wire rather than one strand of wire. In FIGURE 7 the coils $C_1$, $C_2$, $C_3$ and $C_4$ are wound from a first strand of wire, shown by dash lines, and the coils $C_5$ through $C_8$ are wound by a second strand of wire shown as a solid line. The start end of the first strand of wire, labeled $S_1$, is, as in FIGURE 6, located at the tang $h$ and coursed downwardly through slot 4 and upwardly through slot 5 to form the coil $C_1$ and the winding of coils $C_1$ through $C_4$ progresses as in FIGURE 6. The finish end $F_1$ of the first strand of wire projects from the side of coil $C_4$ in slot 4 to tang $d$. The start end, labeled $S_2$, of the second strand of wire is coursed from tang $d$ downwardly through slot 8 and upwardly through slot 5 to form the coil $C_5$. After the coils $C_5$ through $C_8$ have been formed, the finish end $F_2$ of the second strand of wire is brought to tang $h$. Subsequently, the start end $S_1$ and the finish end $F_2$ are twisted together about tang $h$, whereas the start end $S_2$ and the finish end $F_1$ are twisted together about the tang $d$. Once completed, the armatures represented by the wiring diagrams of FIGURES 6 and 7 will be mechanically and electrically identical.

Figure 8:
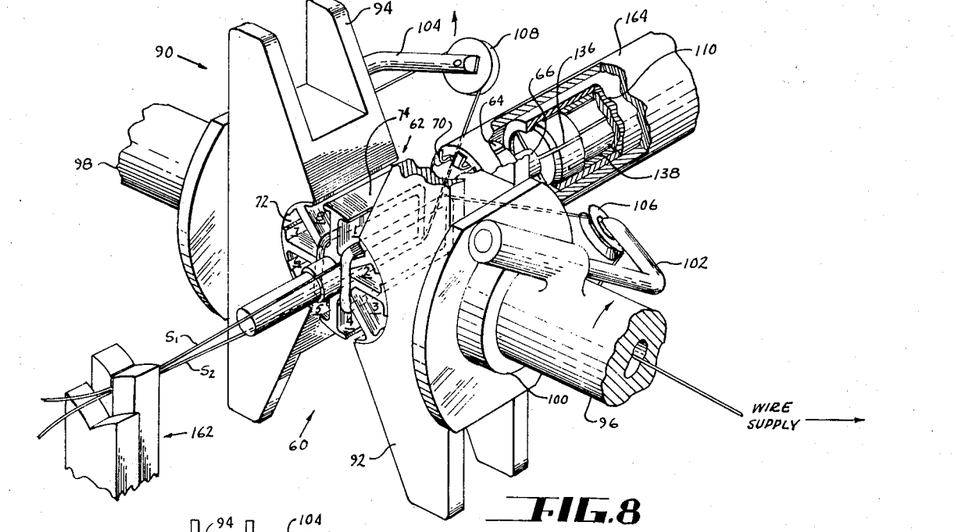
FIGURE 8 is a perspective view, with parts broken away and shown in cross section, of a portion of an armature winding machine in accordance with this invention and illustrating a partially wound armature.
Figure 9:
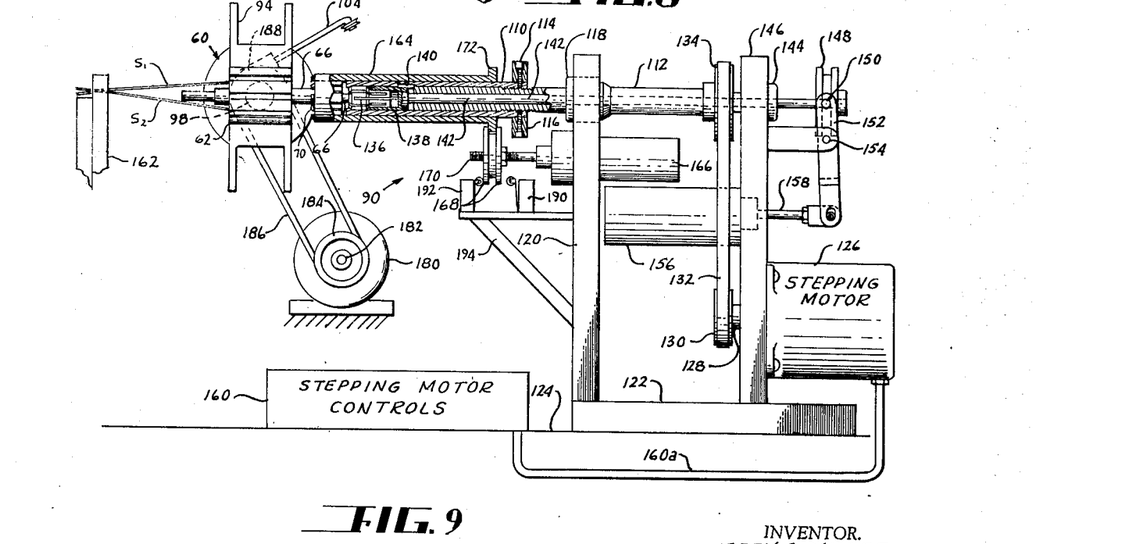
FIGURE 9 is a side elevational view of the machine of FIGURE 8 with parts omitted, broken away and in cross section and illustrating additional parts of the machine.

A double flier armature winding machine, generally designated 90, which may be used to wind armatures having winding patterns of the types shown in FIGURES 2 through 7, is illustrated in FIGURES 8 and 9. In FIGURE 8 the laminated core 62 of the armature 60 is shown abutted by a pair of wire guide wings 92 and 94 mounted on the ends of flier spindles 96 and 98, respectively. Bearings (not shown) mounted in housings, such as the housing 100 between the flier spindle 96 and the guide wing 92, permit rotation of the flier spindles 96 and 98 while the wire guide wings 92 and 94 are held stationary due to their engagement with the laminated core 62. The fliers 102 and 104 are mounted on and rotated with the spindles 96 and 98, respectively. The wire strands used in forming the coils may, as usual, be coursed through the spindle shafts 96 and 98 and around pulleys 106 and 108 on the ends of the fliers 102 and 104, respectively. The fliers 102 and 104 are synchronously rotated in opposite directions such that they pass each other on the same side of the wings 92 and 94 at the horizontal plane containing the longitudinal centerline of the armature shaft 66. Suitable hydraulic or electro-mechanical drives for synchronously rotating fliers are known and in use and, therefore, the drive mechanisms for the fliers 102 and 104 are not illustrated in detail herein. For example, United States Patent No. 3,013,737, issued to Harry W. Moore on Dec. 19, 1961, is illustrative of a hydraulic drive mechanism which could readily be adapted for use with the apparatus of FIGURES 8 and 9. The same patent shows an air actuator arrangement for moving the wire guide wings into and out of engagement with armature cores which could be used in the apparatus of FIGURES 8 and 9.

To provide for a rotary drive for the armature 60 after each coil is wound, the end of the armature shaft 66 adjacent the commutator 64 is clamped to a drive shaft sleeve extension 110 of a hollow armature drive shaft 112. The sleeve extension 110 is threaded on the drive shaft 112 and fixed for rotation therewith by set screws 114 in an annular ring 116 affixed to the sleeve extension 110. The drive shaft 112 is mounted by a bearing 118 in a first support stanchion 120 supported by a plate 122 on a table 124 or the like and is driven by a stepping motor 126 having a drive shaft 128 with a drive pulley 130 mounted thereon connected by a timing belt 132 to a driven pulley 134 affixed to the drive shaft 112. Shown connected to the stepping motor 126 is an electrical control cable 160a leading from a stepping motor control housing 160. Suitable controls located in the housing 160 for sequentially pulsing stepping motors are well known and, hence, not illustrated in detail herein. It will be appreciated that the sequences of operation of the apparatus of FIGURES 8 and 9, to be described below in connection with FIGURES 10 through 21, will be achieved through the motor controls and through suitable sensing switches (not shown) properly located to sequentially detect events occurring throughout the automatic operation of the apparatus.

Clamping of the armature shaft 66 to the sleeve extension 110 may take any convenient form. Illustrated for this purpose in FIGURES 8 and 9 is a split collet sleeve 136 which receives the armature shaft 66 and which is cammed into clamping engagement therewith by a cup-shaped collect clamp member 138 keyed to the sleeve extension 110 by a key 140 and mounted upon a collet actuator shaft 142 which passes axially through the drive shaft 112 and is mounted in a bearing 144 in a second support stanchion 146. On the rearward end of the collet actuator shaft 142, that is the end farthest to the right in FIGURE 9, the actuator shaft 142 has a yoke ring 148 clamped thereto which receives confronting drive pins 150 of a yoke 152. The yoke member 152 is pivoted about a bracket 154 by an air actuator 156 having an air driven piston rod 158 and mounted on the second stanchion 146. As apparent, the armature shaft 66 can be clamped by the collet mechanism upon movement of the piston rod 158 to the right as viewed in FIGURE 9 at the beginning of the winding procedure to be described below. The fully wound armature, at the end of the winding procedure, is released upon movement of the piston rod 158 to the left. The air actuator 156 can be operator controlled by a conventional push button switch control of electrically operated air valves (not shown) or be entirely automatically controlled in response to certain machine operations, all as well known to those skilled in the art.

In FIGURE 8 the armature slots 72 have been labeled 1 through 8 to correspond to the labeling of the slots in FIGURE 7. The coil $C_1$ is shown wound in slots 1 and 4 by the right hand flier 102 while the coil $C_5$ is shown wound by the left hand flier 104 into slots 5 and 8. The start wire ends $S_1$ and $S_2$ may conveniently be clamped by a combined wire clamp and cutter 162, which is only schematically illustrated in FIGURES 8 and 9, and which may be entirely conventional. As with present practice, the start ends $S_1$ and $S_2$ remain clamped until the armature is fully wound at which time they will be coursed through slots 4 and 8, respectively, to the appropriate tangs 70. During the winding of the coils by the fliers 102 and 104, the wire strands follow paths which would cause them to be hooked over exposed tangs 70. For this reason, a cylindrical tang shield 164 is mounted concentrically with and upon the drive shaft 112 and has one end thereof abutted against the commutator tangs. In some cases, the tang shield 164 may overlie the tangs 70. The external diameter of the shield 164 is greater than the total diameter of the commutator 64 with its tangs 70. Hence, the wire strands, when coils are being wound, are cammed away from the tangs 70 by the shield 164. When it is desired to hook the wire leads to the tangs 70, as will be described, the shield 164 is drawn away from the tangs 70 by an air actuator 166 having a pair of discs 168 mounted on its piston rod 170 and straddling a disc 172, the disc arrangement 168 and 172 operating in an obvious fashion to control the location of the tang shield 164 with respect to the tangs 70.

Figure 10:
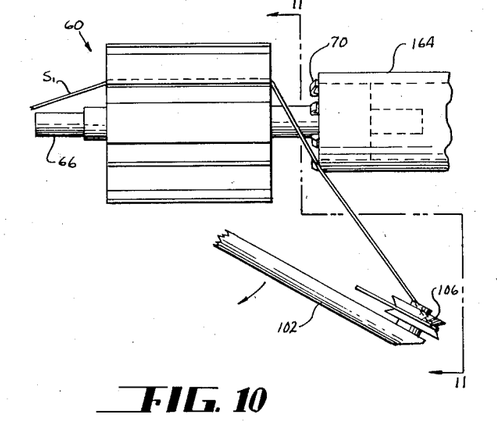
FIGURE 10 is a side elevational view of an armature and a portion of the winding machine of FIGURE 8 and the wire used in forming the armature windings, as these parts appear near the beginning of a winding operation.
Figure 11:
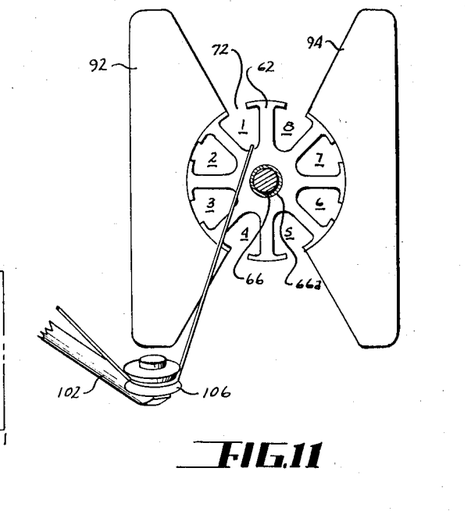
FIGURE 11 is a cross sectional view taken through the armature shaft between the armature core and the commutator and showing an end view of a portion of the winding machine of FIGURE 8 as viewed in the direction of arrows 11—11 of FIGURE 10.
Figure 12:
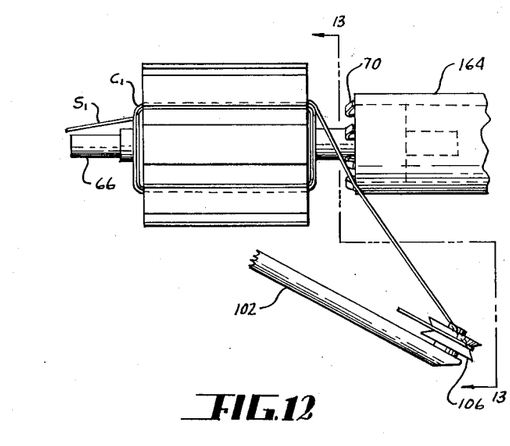
FIGURES 12 and 13 are views similar to FIGURES 10 and 11, respectively, but at the completion of the winding of a coil.
Figure 13:
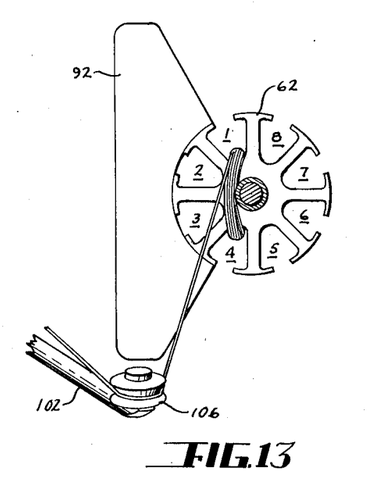

FIGURES 10, 11, 12 and 13 illustrate the sequence of operation of the machine of FIGURES 8 and 9 in winding the coil $C_1$ in slots 4 and 1. The winding of the coil $C_5$ by the flier 104 is not illustrated, it being well understood by those skilled in the art that the winding of the coil $C_5$ would proceed in substantially the same fashion as the winding of the coil $C_1$ but with the flier 104 rotating in the opposite direction from the flier 102. In FIGURE 10 the shield 164 is shown abutted against the tangs 70 to prevent hooking of the wire on any of the tangs 70 as the flier 102 rotates. Upon rotation of the flier 102, the wire used to form coil $C_1$, with its start end $S_1$ clamped at 162 is pulled through a conventional wire tensioning device (not shown) at its supply end, through the spindle 96, and, as shown in FIGURES 10 and 11, is guided by the wire guide wing 92 into slots 1 and 4. The winding progresses until the appropriate number of turns have been wound by the flier 102 rotating in a clockwise direction as viewed in FIGURE 10 to complete coil $C_1$. In the FIGURES 12 and 13 position, coil $C_1$ is fully wound and the flier 102 has come to rest with the length of wire leading from slot 1 to the pulley 106 lying adjacent the tang shield 164. FIGURES 12 and 13, it will be observed, show the same point in the sequence of operation as that illustrated in the perspective view of FIGURE 8.

Figures 14, 15, 16, 17, 18:
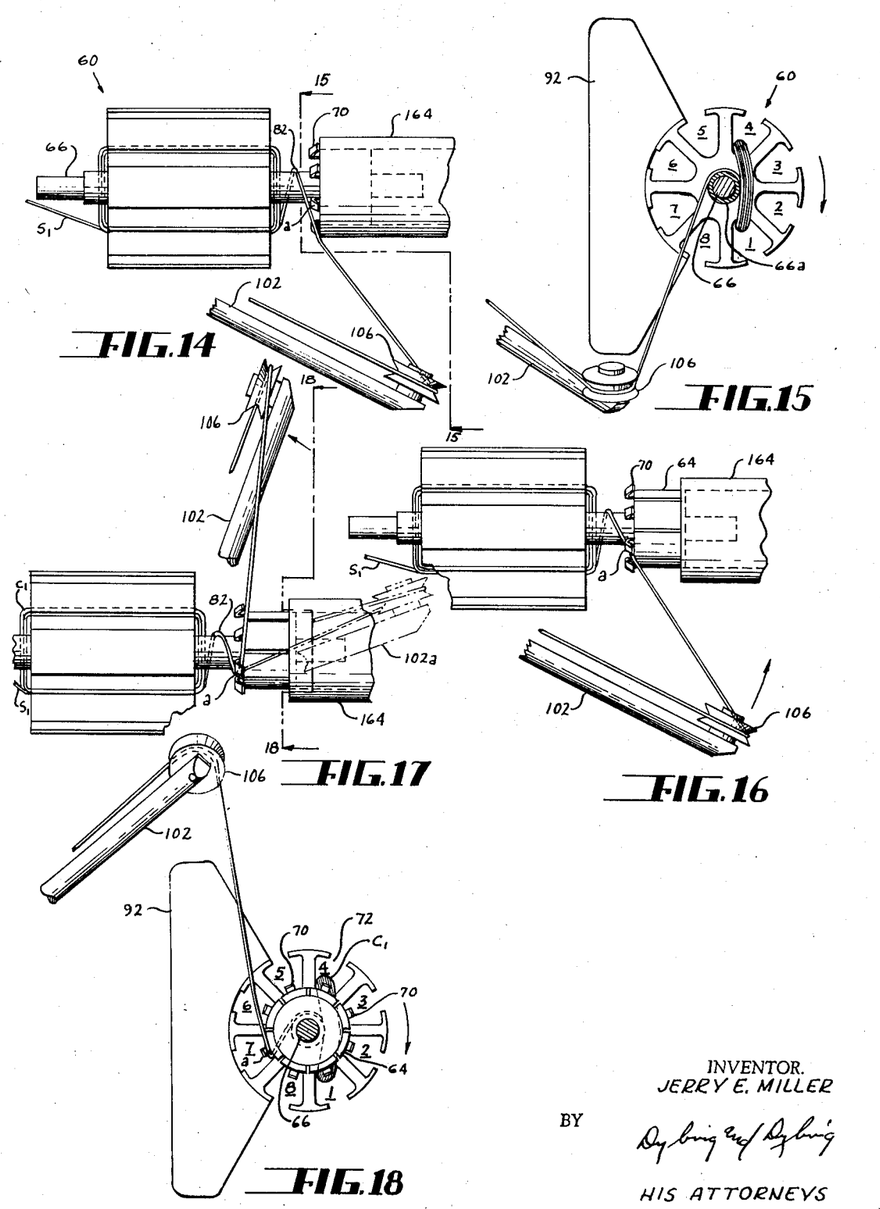
FIGURES 14 through 20 illustrate the sequence of steps for forming a wire commutator lead connection in accordance with this invention.
Figures 19, 20, 21:
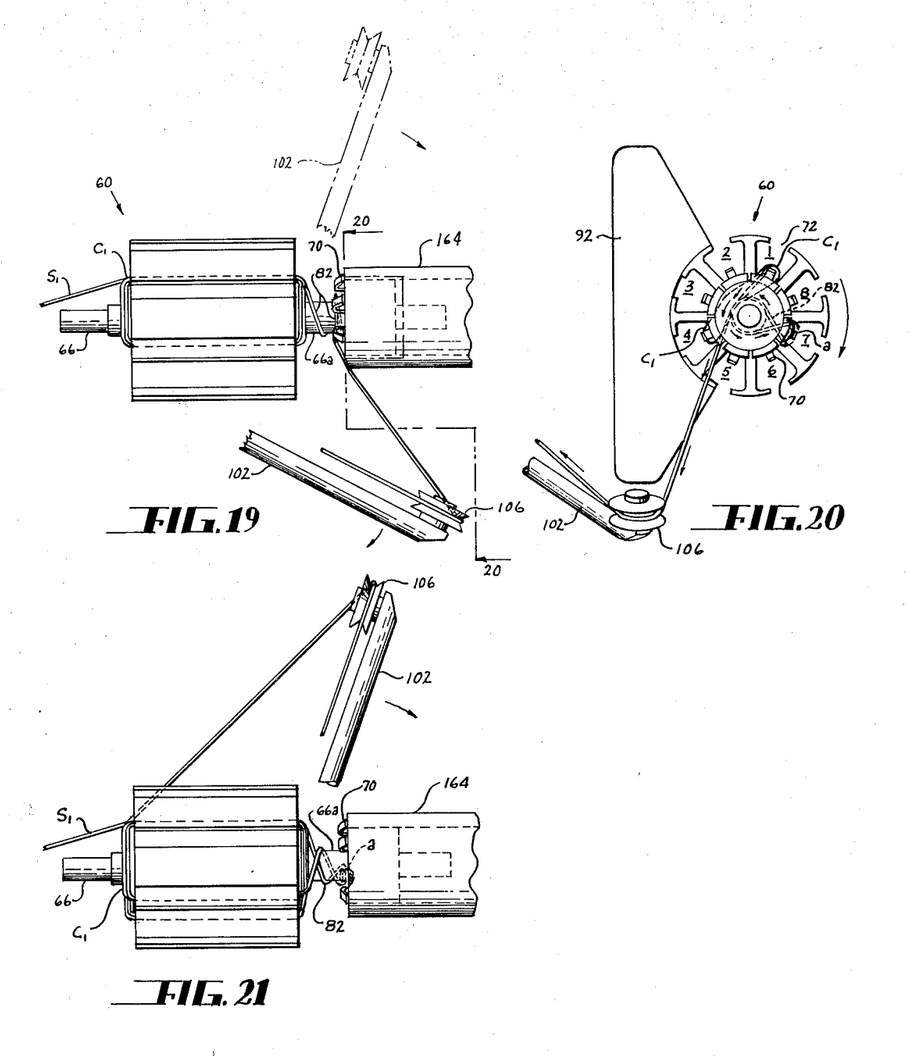
FIGURE 21 is a side elevational view similar to FIGURE 10 illustrating the position of parts at the beginning of the winding of a second coil.

In FIGURES 14 and 15 the flier 102 is still arrested in the same position as that shown in FIGURES 12 and 13. However, the armature 60 has now been rotated through the operation of the stepping motor 126 shown in FIGURE 9 by 180°. During this increment of rotation of the armature 60 the shield 164 has remained in place abutted against the tang 70. The effect of rotating the armature 60 while holding the flier 102 stationary is to draw wire from the flier 102 and partially wrap the wire about the shaft 66 and its insulating sleeve, designated 66a, to partially form the wire lead 82. The 180° rotation of the armature 60 has resulted in the tang a being brought to a position just above the wire leading from the slot 1 to the flier pulley 106. Accordingly, with the armature 60 now stationary, the shield 164 is withdrawn from the tangs 70, i.e. moved to the right as illustrated and viewed in FIGURE 16 by the shield air actuator 166 shown in FIGURE 9. The position of the parts is then as illustrated in FIGURE 16. The wire is then looped back over the tang *a* by rotating the flier 102 in a reverse or counterclockwise direction from that shown in FIGURE 16 through the broken line position shown in FIGURE 17 to the nearly vertical position shown in full lines in FIGURES 17 and 18. Thereafter, the shield 164 is moved back into abutment with the tangs 70, thus trapping the wire leading to the flier pulley 106 between the tang *a* and the shield 164. The armature 60 is then rotated in the same direction as before, that is in a clockwise direction as viewed in FIGURE 20, beyond 360° from its original position wherein slots 1 and 4 were presented for the winding of coil $C_1$ to appropriately position slots 2 and 5 adjacent the guide wing 92. Thereafter, the flier 102 is rotated in a clockwise direction from its dotted line position in FIGURE 19 to begin the forming of coil $C_2$ in slots 2 and 5. As soon as the wire is pulled into slot 5, the wire lead 82 is completely wrapped about the shaft 66 as well as looped about the tang *a*. FIGURE 21 clearly illustrates the single wire lead 82 which is formed between the coils $C_1$ and $C_2$ with the flier 102 rotating in a clockwise direction having partially wound the first turn of coil $C_2$. In the foregoing operation, when the armature 60 is rotated between the winding of the coils $C_1$ and $C_2$, the wire guide wings 92 and 94 may be moved slightly away from the armature core 62 so as not to interfere with such rotation.

Referring again to FIGURE 8, it will be understood that the coils $C_1$ and $C_5$ are simultaneously wound by the fliers 102 and 104, respectively. Because the fliers 102 and 104 rotate in opposite directions, the end turns of all the coils as viewed from the commutator end of the armature span the slots in the same direction. The stopped position of the fliers 102 and 104 shown in FIGURE 8 is such that upon subsequent rotation of the armature 60, the tang *e* will be positioned immediately below the length of wire from slot 5 to the pulley 108 at the same time the tang *a* is positioned above the wire leading from coil $C_1$ to the pulley 106 as previously described in connection with FIGURE 14. The reverse rotation of the flier 102 illustrated by a comparison of FIGURES 14 through 18 is accompanied by a simultaneous reverse rotation of the flier 104 so that wire is hooked about tang *e* at the same time that wire is hooked about tang *e* and completely wrapped or looped about has progressed to the point illustrated in FIGURE 21, the wire lead 82 between coils $C_5$ and $C_6$ will be looped about tange *e* and completely wrapped or looped about the shaft 66 in the same direction as the illustrated wire lead between coils $C_1$ and $C_2$. The winding of the armature 60 will continue in the manner just described until all coils have been wound with wire leads 82 therebetween. The armature shaft 66 is then released by the collet sleeve 136 and the start and finish wires twisted about appropriate commutator tangs as discussed above.

As apparent from the foregoing, the armature 60 is rotated in two increments by the stepping motor 126 between the winding of a pair of coils, first simultaneously to position the selected tangs 70 adjacent the wire leading to the fliers 102 and 104 about which the wire leads are to be hooked, and then rotated through an additional angle in the same direction to position the appropriate pairs of slots for receiving the next pair of coils to be wound by the fliers 102 and 104. The specific example discussed in FIGURES 7 through 21 involves the "progressive" pattern of wind mentioned above and, accordingly, the total rotation of armatures between the winding of pairs of coils is larger than 360° by the angle between adjacent slots. If the same armature were to be progressively wound with two coils per slot, the total rotation of the armature between the first pair of coils wound in a first pair of slots and the next pair of coils wound in the same pair of slots would be 360°. And after the second coil is wound in each of the first pair of slots, the total rotation of the armature in forming the wire leads 82 would be 360° plus the angle between adjacent slots, whereupon the first pair of coils would be formed in the second pair of slots. This procedure, of course, would be repeated until all sixteen coils are wound.

The retrogressive wind discussed above in connection with FIGURE 3 can easily be accomplished with the same mechanism shown in FIGURES 8 and 9 but with the stepping motor controls so adjusted that the total rotation of the armature between coils to be wound in adjacent slots would be one slot width less than 360°. The wire leads between coils would still, of course, be wrapped around the armature shaft through an angle greater than 360° when the fliers 102 and 104 are subsequently rotated to wind the next pair of coils. Thus, it is seen that by virtue of the winding pattern of this invention and the apparatus of this invention, armatures having opposite polarities can be wound by merely adjusting the sequence control for the stepping motor 126. Sequential controls for stepping motors are commercially available in which the angle through which the stepping motor rotates upon each operation can be "dialed in" at the stepping motor control housing 160. In contrast, prior practice in armature winding machines frequently would require a complete revision of the tooling and a change in the direction of rotation of either the fliers or the armature as the winding operation progressed. Naturally, the changes in the armature winding machine would often be drastic and time-consuming.

As obvious, the winding pattern, the method, and the apparatus of this invention can be used when winding armatures having any usual number of slots, whether odd or even, and can be used to wind armatures having either one or two coils per slot. When winding odd slot armatures, the first coil or coils in the first pair of slots would be wound with only one flier operating; the remaining coils would be wound simultaneously in pairs by the two fliers 102 and 104. Also, the winding process described above could be accomplished by a single flier machine. Thus, in connection with FIGURES 10 through 21, the single flier operation illustrated therein could be used without another flier simultaneously operating therewith, but with repeated indexing or rotating of the armature sufficient to enable the single flier 102 to wind all of the coils. Further, it should be appreciated that the winding pattern is quite flexible and can be varied to meet the needs of the motor manufacturer. For example, the initial increment of rotation of the armature 60 to pick up tang *a*, as illustrated in FIGURES 14 and 15, could either be greater or less than 180° to pick up a different tang 70 which would be clockwise circumferentially either closer to or further from the commutator slot 1 from which the wrie projects, the subsequent increment of rotation of the armature being through either a greater o a lesser angle in order to properly position slots 2 and 5 for receiving a coil as illustrated in FIGURE 20.

Because wire leads are wrapped about the armature shaft rather than hooked about the armature teeth, the only time the fliers are reverse rotated is when the wire is hooked around the tangs 70 and, of course, there will be no tendency for the coils previously wound to unwind. When the fliers are thereafter rotated in the forward direction, that is the direction required to wind a coil, the wires cannot be unhooked from the tangs because they are trapped by the tang shield 164. Because the fliers rotate throughout almost the entire winding cycle in only one direction, with only the short reverse rotation used to hook the wire leads on the tangs, it will be appreciated that the flier drive mechanism, such as the hydraulic drive mechanism previously suggested and the automatic controls therefore, would be relatively simple. The speed with which an armature can be fully wound may be considerably reduced in view of this invention because there are fewer movements of the fliers and the armature required than in many other winding methods in which the wire leads are placed close to the armature shaft or in which lead loops are formed between coils.

To illustrate the nature of the automatic controls, a hydraulic motor 180 is shown in FIGURE 9 which has an output shaft 182 driving a pulley 184 connected by a timing belt 186 to a driven pulley 188 affixed to the flier spindle 98 to rotate the flier 104. The same drive shaft 182 could be connected through a suitable reversing mechanism to the spindle 96 so that the fliers 102 and 104 rotate synchronously but in opposite directions. Also shown in FIGURE 9 are a pair of sensing switches 190 and 192 mounted by a bracket 194 on the support stanchion 120 which sense the completion of forward and rearward movements of the discs 168 driven by the air actuator 166 to trigger operations subsequent to the tang shield withdrawal and shielding movements respectively. The rotation of the flier spindles 86 and 98 or the output shaft 182 could be sensed by switches responsive to cams (not shown) thereon. Of course, the described automatic controls are only exemplary of the type of controls commonly used and well known to those skilled in the art.

Although the presently preferred embodiment of the device has been described, it will be understood that within the purview of this invention various changes may be made within the scope of the appended claims.

Having thus described my invention, I claim:

1. In a winding for an armature core on an armature shaft, the winding being of the type including a pair of coils in said armature core and a wire lead between said pair of coils connected to a commutator segment, the improvement wherein said wire lead is looped around the armature shaft, said wire lead extending from the finish of one of said pair of coils in a predetermined direction about the armature shaft to said commutator segment and extending from said commutator segment in the same direction about said armature shaft to the start of the other of said pair of coils.

2. The improvement of claim 1 wherein said commutator segment is of the type having a commutator tang projecting from a commutator to said core and wherein an intermediate part of said wire lead is looped about said commutator tang.

3. In an armature of the type having a shaft, a core on said shaft having a plurality of armature slots for receiving coils, and a commutator on said shaft having a commutator segment for each coil, an armature winding including wire wound into a plurality of coils located in a plurality of said armature slots, and a plurality of wire leads, one wire lead being between a pair of said coils and formed from said wire, each wire lead extending completely around said shaft and each wire lead having part thereof intermediate its ends connected to one of said commutator segments.

4. The structure of claim 3 wherein all of the coils in said armature are wound from a single wire and the two ends of said wire are connected to a single commutator segment.

5. The structure of claim 3 wherein all of the coils in said armature are wound from two wires, one end of both of said wires being connected to one of said commutator segments and the other end of both of said wires being connected to another one of said commutator segments.

6. The structure of claim 3 wherein each commutator segment has a lead receiving tang and wherein said intermediate part of each said wire lead is looped about one of said tangs.

7. The structure of claim 6 wherein each said wire lead crosses itself under the said tang about which it is looped.

8. The structure of claim 7 wherein all of the coils in said armature are wound from a single wire and the two ends of said wire are connected to a single commutator segment.

9. The structure of claim 7 wherein all of the coils in said armature are wound from two wires, one end of both of said wires being connected to one of said commutator segments and the other end of both of said wires being connected to another one of said commutator segments.

10. In an armature of the type having a shaft, a slotted armature core on said shaft for receiving coils of wire, and a commutator on said shaft having a plurality of commutator segments each provided with a wire lead receiving tang, an armature winding including a plurality of coils wound from a single wire located in a plurality of said slots, a wire lead formed from said single wire between each pair of said coils, each of said wire leads having an intermediate portion looped under, over and back under one of said lead receiving tangs.

11. The structure of claim 10 wherein each of said wire leads is looped about said shaft.

12. In an armature of the type having an armature shaft, a slotted armature core mounted on said shaft, a commutator mounted on said shaft adjacent one end of said core, said commutator having a plurality of wire lead receiving portions, and an electric winding comprised of wire wound into coils in pairs of slots in said armature core, said wire having a start end leading to one of said coils, a finish end leading from another of said coils, said start and said finish ends each being connected to the same tang to form a wire lead, and a plurality of other wire leads, each of said other wire leads extending between a pair of coils, the improvement wherein each of said wire leads extends from the finish of the first of said pair of coils between which it extends in a predetermined direction to one of said wire lead receiving portions of said commutator and extends in said predetermined direction from said one of said wire lead receiving portions of said commutator around said armature shaft past said finish of said first of said pair of coils to the start of the second of said pair of coils between which it extends.

13. The structure of claim 12 wherein said wire lead receiving portions of said commutator are tangs, one tang being associated with each of said wire leads and projecting from said commutator toward said armature core and wherein each of said wire leads extends in said predetermined direction from said finish of said first of said pair of coils under a selected one of said tangs, extends in the opposite direction over said selected tang, and extends in said predetermined direction from and under said selected tang to said start of said second of said pair of coils.

14. The structure of claim 13 wherein all of said coils and said finish end being an end part of another of said start end being an end part of one of said wire strands and said finish end being an end part of another of said wire strands, and wherein the other ends of said wire strands are both connected to another one of said tangs.

References Cited

UNITED STATES PATENTS

| 2,756,354 | 7/1956 | Baron | 310—234 X |
| 3,309,548 | 3/1967 | Gough et al. | 310—234 |
| 3,395,448 | 8/1968 | Moore | 29—596 |
| 3,395,449 | 8/1968 | Moore | 310—234 X |
| 3,448,311 | 6/1969 | Mommsen et al. | 310—234 |
| 2,306,855 | 12/1942 | Allen | 310—206 |
| 2,648,792 | 8/1953 | Wylie | 310—234 |
| 2,714,174 | 7/1955 | Applegate | 310—265 |
| 2,779,886 | 1/1957 | Hunsdorf | 310—265 |
| 3,231,206 | 1/1966 | Moore | 310—234 X |

FOREIGN PATENTS

| 1,025,773 | 4/1966 | Great Britain. |

DONOVAN F. DUGGAN, Primary Examiner

U.S. Cl. X.R.

310—265

PO-1050
(5/69)

UNITED STATES PATENT OFFICE
CERTIFICATE OF CORRECTION

Patent No. 3,506,864        Dated April 14, 1970

Inventor(s) Jerry E. Miller

It is certified that error appears in the above-identified patent and that said Letters Patent are hereby corrected as shown below:

Column 3, line 11, "tanks" should read ---tangs---.

Column 11, line 47, "about tang e and completely wrapped or looped about" should read ---about tang a. By the time the winding of coils $C_1$ and $C_2$---.

Column 11, line 50, "tange" should read ---tang---.

Column 12, line 54, "wrie" should read ---wire---.

Column 12, line 55, "o" should read ---or---.

Column 12, line 72, "therefore" should read ---therefor---.

Column 13, line 18, "spindles 86" should read ---spindles 96---.

Column 14, line 52, "and said finish end being an end part of another of said" should read ---and said wire leads are made from two wire strands, said---.

SIGNED AND
SEALED
AUG 25 1970

(SEAL)
Attest:

Edward M. Fletcher, Jr.
Attesting Officer

WILLIAM E. SCHUYLER, JR.
Commissioner of Patents